United States Patent [19]

Onan et al.

[11] Patent Number: 5,501,277
[45] Date of Patent: Mar. 26, 1996

[54] COMBATING LOST CIRCULATION DURING THE DRILLING OF WELLS

[75] Inventors: David D. Onan, Lawton; Bobby G. Brake, Duncan, both of Okla.

[73] Assignee: Halliburton Company, Duncan, Okla.

[21] Appl. No.: 399,266

[22] Filed: Mar. 6, 1995

[51] Int. Cl.⁶ ................................................. E21B 33/138
[52] U.S. Cl. ..................... 166/293; 106/706; 106/708; 166/292; 175/72
[58] Field of Search ...................... 166/292, 293; 175/72; 106/705, 706, 707, 708

[56] References Cited

U.S. PATENT DOCUMENTS

| | | | |
|---|---|---|---|
| 3,409,093 | 11/1968 | Cuningham et al. | 175/72 X |
| 3,483,007 | 10/1969 | Hook | 166/293 X |
| 3,557,876 | 1/1971 | Tragesser | 166/292 |
| 3,669,701 | 6/1972 | Biederman, Jr. | 166/292 X |
| 3,713,489 | 1/1973 | Fast et al. | 166/292 |
| 3,876,005 | 4/1975 | Fincher et al. | 166/292 |
| 4,110,225 | 8/1978 | Cagle | 166/292 X |
| 4,515,216 | 5/1985 | Childs et al. | 166/293 |
| 4,680,059 | 7/1987 | Cook et al. | 106/120 |
| 5,018,906 | 5/1991 | Bonier-Sahuc | 405/263 |
| 5,073,197 | 12/1991 | Majumdar et al. | 106/692 |
| 5,168,928 | 12/1992 | Terry et al. | 166/292 |
| 5,295,543 | 3/1994 | Terry et al. | 166/293 |
| 5,311,944 | 5/1994 | Cowan et al. | 166/292 |
| 5,325,922 | 7/1994 | Cowan et al. | 166/293 |
| 5,327,968 | 7/1994 | Onan et al. | 166/293 |
| 5,332,041 | 7/1994 | Onan et al. | 166/295 |
| 5,383,521 | 1/1995 | Onan et al. | 166/293 |

*Primary Examiner*—George A. Suchfield
*Attorney, Agent, or Firm*—Craig W. Roddy; Stephen R. Christian; C. Clark Dougherty, Jr.

[57] ABSTRACT

The present invention provides improved methods of combating lost drilling fluid circulation in wells, particularly in wells penetrating vugular and naturally fractured formations such as geothermal wells. The methods basically comprise the steps of forming a quick set cementitious composition which when drilled after setting produces cuttings compatible with the drilling fluid being used, introducing the cementitious composition into the drilling fluid thief zone in the well, allowing the composition to set into a cementitious plug in the thief zone and then continuing the drilling of the well bore through and below the cementitious plug.

20 Claims, No Drawings

COMBATING LOST CIRCULATION DURING THE DRILLING OF WELLS

BACKGROUND OF THE INVENTION

1. Field of the Invention

The present invention relates to methods of combating lost drilling fluid circulation in wells, and more particularly, to such methods wherein cementitious plugs are formed in subterranean drilling fluid thief zones.

2. Description of the Prior Art

In the drilling of wells through naturally fractured formations, lost drilling fluid circulation problems are often encountered. That is, as subterranean vugs, fractures and other thief zones are encountered during the drilling of a well bore, drilling fluid circulation is often lost and drilling operations must be terminated while remedial steps are taken. Such problems are pronounced in the drilling of geothermal wells which are usually drilled in highly vugular and/or fractured formations.

Heretofore, drilling fluid thief zones encountered in the drilling of wells have been plugged utilizing conventional hydraulic cement compositions, e.g., Portland cement compositions. While such cement plugs can be made to work successfully, the time required for allowing the cement composition to cure and then drilling the well bore through the cured plug makes the plugging operation very uneconomical. Additionally, when the well bore is drilled through such plugs, the high lime content cement cuttings produced often adversely react with drilling fluid in contact therewith whereby the rheology of the drilling fluid is changed. This in turn requires drilling fluid conditioning before normal drilling operations are resumed.

Thus, there is a need for improved methods of combating lost drilling fluid circulation into subterranean thief zones whereby the thief zones can be rapidly plugged without affecting the rheology of the drilling fluid to thereby reduce rig time and drilling fluid conditioning expense.

SUMMARY OF THE INVENTION

Improved methods of combating lost drilling fluid circulation into a subterranean thief zone penetrated by a well bore are provided which overcome the shortcomings of the prior art and meet the needs described above. The methods are basically comprised of the steps of forming a quick set cementitious composition comprised of an amorphous silica material, water and an alkali which subsequently sets into a hard substantially impermeable mass, introducing the cementitious composition into the subterranean drilling fluid thief zone by way of the well bore, allowing the cementitious composition to set into a plug in the thief zone and in the well bore and then continuing the drilling of the well bore through and below the plug.

A cementitious composition formed in accordance with the present invention can have a relatively low density which allows the composition to remain in place in a well bore while setting. Also, the composition sets very quickly which reduces drilling rig downtime. Further, because the composition has a low alkali level as compared to the conventional hydraulic cement compositions heretofore utilized, the drill cuttings produced when the set composition is drilled out of the well bore do not materially affect drilling fluid rheology or other properties.

It is, therefore, a general object of the present invention to provide improved methods of combating lost well drilling fluid circulation problems.

A further object of the present invention is the provision of improved methods of combating lost drilling fluid circulation problems which reduce drilling rig down time and drilling fluid conditioning expense.

Other and further objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells in some areas subterranean formations are encountered which contain high incidences of drilling fluid thief zones, e.g., natural vugs and fractures. As a result, drilling fluid circulation is often lost during drilling which requires the termination of drilling and the implementation of remedial procedures. Heretofore, such remedial procedures have generally involved the placement of a conventional hydraulic cement composition in the thief zone and in the well bore adjacent thereto which is allowed to set into a hard substantially impermeable mass therein. The set cement in the well bore is then drilled out of the well bore.

The hydraulic cement compositions heretofore utilized, e.g., Portland cements, have relatively long set times and contain relatively high levels of lime. Consequently, significant quantities of lime are released from the set cements during drill out by way of the drill cuttings. The lime release into the drilling fluid often causes the rheological properties of the drilling fluid to be altered which in turn requires the drilling fluid to be reconditioned. The combination of long drilling rig down time during which the hydraulic cement plug is placed and allowed to set, and the extra drilling fluid conditioning expense, make the drilling of such wells very expensive. While drilling fluid lost circulation problems can occur during the drilling of any well, they are more often encountered in the drilling of geothermal wells.

The improved methods of the present invention for combating lost drilling fluid circulation into a subterranean thief zone penetrated by a well bore are basically comprised of the following steps. A quick set cementitious composition is formed comprised of an amorphous silica material, water present in an amount sufficient to form a slurry and an alkali present in an amount sufficient in the presence of water to react with the amorphous silica material and impart cementitious properties thereto. Upon being formed, the cementitious composition will subsequently set into a hard substantially impermeable mass. The cementitious composition is introduced into the thief zone which caused the loss of drilling fluid circulation, and the composition is allowed to set into a hard substantially impermeable plug in the thief zone and in the well bore adjacent thereto. The drilling of the well bore is then continued whereby the cement plug is drilled out of the well bore and normal drilling proceeds.

Because the cementitious silica composition contains low levels of alkali, the cuttings produced when the plug is drilled out of the well bore do not materially affect the properties of the drilling fluid whereby abnormal conditioning of the drilling fluid is required. More importantly, the cementitious silica composition rapidly sets and develops compressive strength whereby normal drilling operations can be resumed much more quickly than has heretofore been possible.

While various forms of synthetic or natural alkali-activated amorphous silicas can be utilized in accordance with this invention, preferred such amorphous silica materials are those selected from the group consisting of fly ash, condensed silica fume, rice hull ash, natural pozzolan and mixtures of two or more of such materials. The term "fly ash" is used herein to mean the finally divided synthetic pozzolan type of material which is the residue that results from the combustion of ground or powdered coal and is carried by the flue gases generated. Fly ash, like natural pozzolan, possesses little or no cementitious value, but in finely divided form and in the presence of water chemically reacts with an alkali to form a material possessing cementitious properties. Fly ash particles have diameters smaller than about 36 microns, and the surface area of the particles is generally greater than about 400 square meters per kilogram.

Condensed silica fume is another synthetic pozzolan type of material which is a byproduct produced in the manufacture of silicon and ferosilicon. Silicon and ferosilicon are obtained by subjecting quartz (when silicon is produced) or quartz and iron bearing material (when ferosilicon is produced) to reduction with coke or coal and wood chips in an open electric arc furnace. The reduction reaction involves an intermediate reaction wherein a gaseous suboxide of silicon is formed and part of the gaseous suboxide of silicon escapes into the atmosphere. The gaseous suboxide of silicon reacts with oxygen in the atmosphere and condenses to form glassy microscopic particles known as condensed silica fume.

The condensed silica fume is recovered by filtration, and like fly ash, is characterized by having a fine particle size. The particles of condensed silica fume have diameters smaller than about 1 micron. The specific surface area of condensed silica fume particles is about 20,000 square meters per kilogram.

Rice hull ash is a synthetic pozzolan type of amorphous silica material similar in particle size and physical characteristics to fly ash. Rice hull ash is obtained by burning rice hulls.

Natural pozzolan is obtained from powdered volcanic rock and the like, and is comprised of a siliceous or siliceous and aluminous material which reacts in the presence of water with alkali to produce a cementitious material.

A preferred fine particle size amorphous silica material for use in accordance with the present invention which includes alkali in situ is a fine particle size fly ash classified as ASTM Class C fly ash. ASTM Class C fly ash has the approximate physical properties set forth in Table I below.

TABLE I

Physical Properties of Fine
Particle Size ASTM Class C Fly Ash

| | |
|---|---|
| Appearance: | Light tan to mustard |
| Specific Gravity[1]: | 2.70 |
| Average Bulk Density[2]: | 77 lb/cu. ft. |
| Absolute Volume Factor: | 0.0487 |
| Average Particle Size: | 9 microns |
| Maximum Particle Size: | 36 microns |
| Percent Under 8.0 microns: | 40% |
| Specific Surface Area: | Range: 1.15–1.63 m$^2$/cc |
| Normal Water Requirement[3]: | 40% |

[1]Specific gravity determination by Beckman air compression pycnometer.
[2]Apparent bulk density determination (ASTM C110 Part 15 & 16).
[3]API Specification for Materials and Testing for Well Cements, Fifth Edition, July 1, 1990, page 42, Appendix B, Section B1; "Determination of Normal and Minimal Water Content of Slurry".

The oxide analysis of ASTM Class C fly ash having the above physical properties is set forth in Table II below.

TABLE II

Oxide Analysis of ASTM Class C Fly Ash

| Component | Percent by Weight |
|---|---|
| Aluminum Oxide ($Al_2O_3$) | 16.78 |
| Silicon Dioxide ($SiO_2$) | 31.47 |
| Iron Oxide ($Fe_2O_3$) | 7.09 |
| $Al_2O_3 + SiO_2 + Fe_2O_3$ | 55.34 |
| Calcium Oxide (CaO) | 29.91 |
| Sulfur Trioxide ($SO_3$) | 3.39 |
| Magnesium Oxide (MgO) | 6.18 |
| Titanium Dioxide ($TiO_2$) | 1.37 |
| Potassium Oxide ($K_2O$) | 0.45 |
| Sodium Oxide ($Na_2O$) | 1.36 |
| Total Alkali ($K_2O \times .658 + Na_2O$) | 1.65 |
| Strontium Oxide (SrO) | 0.48 |
| Barium Oxide (BaO) | 0.96 |
| Manganese Oxide (MnO) | 0.05 |
| Loss on Ignition (LOI) | 0.52 |
| Free Lime (ASTM) | 0.60 |
| Borate Content | 0 |

A particularly preferred fine particle size amorphous silica material for use in accordance with the methods of this invention is comprised of a mixture of ASTM Class C fly ash and condensed silica fume wherein the silica fume is present in an amount in the range of from about 10% to about 20% by weight of the fly ash present.

The water utilized for forming a cementitious composition useful in accordance with this invention can be any water which does not adversely react with other components in the composition. Fresh water is generally preferred. The cementitious composition is formed by mixing one or more of the above described amorphous silica materials with sufficient water to form a pumpable slurry. Generally, the composition contains water in an amount in the range of from about 54% to about 160% by weight of amorphous silica material in the composition.

When amorphous silica materials other than ASTM Class C fly ash are utilized, an alkali is also included in the cementitious composition. Preferred alkalis are selected from the group consisting of calcium hydroxide, barium hydroxide, magnesium oxide, strontium oxide and mixtures of two or more of such compounds. Calcium hydroxide is the most preferred alkali. The alkali is included in the cementitious composition in an amount in the range of from about 10% to about 20% by weight of the amorphous silica material included therein.

As mentioned above, a particularly preferred amorphous silica cementitious composition is comprised of ASTM Class C fly ash, condensed silica fume present in the composition in an amount in the range of from about 10% to about 20% by weight of ASTM Class C fly ash therein and water present in the composition in an amount in the range of from about 60% to about 160% by weight of fly ash and condensed silica fume therein.

In order to facilitate the dispersal of the amorphous silica material particles in the water and maintain the particles in suspension therein, a dispersing agent is preferably included in the cementitious compositions. While a variety of dispersing agents can be utilized, a particularly suitable such dispersing agent is the condensation polymer product of an aliphatic ketone, an aliphatic aldehyde and a compound which introduces acid groups into the condensation polymer. Such a dispersing agent is disclosed in U.S. Pat. No. 4,818,288 issued on Oct. 4, 1989 to Aignesberger et al. A particularly preferred such dispersing agent is comprised of the condensation polymer product of acetone, formaldehyde and sodium sulfite.

Another suitable dispersing agent is a blend of polyvinylpyrrolidone and the condensate of sodium naphthalene sulfonate with formaldehyde. This dispersing agent is described in U.S. Pat. No. 3,359,225 issued on Dec. 19, 1967 to Weisend.

Other dispersing agents which can be utilized include gluconic acid delta lactone, naphthalene sulfonic acid, and the blend of polyvinylpyrrolidone and the condensate of sodium naphthalene sulfonate with formaldehyde described above mixed with a metal lignosulfonate salt.

When a dispersing agent is utilized in the cementitious compositions, it is generally included therein in an amount in the range of from about 0.25% to about 1.25% by weight of the amorphous silica material in the composition.

In order to allow enough pumping time for an amorphous silica cementitious composition of the type described above to be placed in a subterranean thief zone to be plugged, a set retarding additive can be included in the composition. A variety of set retarding additives can be utilized including ammonia and other metal lignosulfonate salts, e.g., ammonium lignosulfonate, calcium lignosulfonate, sodium lignosulfonate and the like, the copolymer of "AMPS®" (2-acrylamido-2-methylpropane sulfonic acid) and acrylic acid described in U.S. Pat. No. 5,049,288 issued Sep. 17, 1991 to Brothers et al., tartaric acid, citric acid, trisodium citrate, gluconic acid, potassium pentaborate, potassium perborate, aminotri(methylenephosphonic acid) and mixtures of two or more of such set retarding additives. Preferably, the set retarding additive is citric acid present in the cementitious composition in an amount in the range of from about 0.1% to about 1.25% by weight of the amorphous silica material therein.

Thus, a cementitious composition for use in accordance with this invention can be comprised of an amorphous silica material selected from the group consisting of fly ash, condensed silica fume, rice hull ash, natural pozzolan and mixtures of two or more of said materials, water present in an amount sufficient to form a pumpable slurry, a dispersing agent for facilitating the dispersal of the amorphous silica material in the water and maintaining it in suspension therein, preferably the condensation polymer product of acetone, formaldehyde and sodium sulfite, present in the composition in an amount in the range of from about 0.25% to about 1.25% by weight of amorphous silica material therein, an alkali selected from the group consisting of calcium hydroxide, barium hydroxide, magnesium oxide, strontium oxide and mixtures of two or more of such compounds present in the composition in an amount in the range of from about 10% to about 20% by weight of amorphous silica material therein and a set retarder, preferably citric acid, present in the composition in an amount in the range of from about 0.1% to about 1.25% by weight of amorphous silica material therein.

A particularly preferred cementitious composition including a dispersing agent and set retarder is comprised of ASTM Class C fly ash, condensed silica fume present in the composition in an amount in the range of from about 10% to about 20% by weight of ASTM Class C fly ash therein, water present in the composition in an amount sufficient to form a pumpable slurry, a dispersing agent comprised of the condensation polymer product of acetone, formaldehyde and sodium sulfite present in the composition in an amount of about 0.25% to about 1.25% by weight of the ASTM Class C fly ash and condensed silica fume therein and a citric acid set retarder present in the composition in an amount in the range of from about 0.1% to about 1.25% by weight of the ASTM Class C fly ash and condensed silica fume in the composition.

As will be understood by those skilled in the art, the cementitious compositions of this invention can include any of the variety of other well cement composition additives known in the art which bring about desired results without adversely affecting other components in the cementitious compositions. Such additives include fluid loss control additives, friction loss reducing additives and the like.

The cementitious compositions quickly set into hard substantially impermeable masses in time periods in the range of from about 4 hours to about 16 hours at relatively low densities in the range from about 82 pounds per cubic feet to about 105 pounds per cubic feet and at temperatures in the range of from about 75° F. to about 250° F.

The improved methods of this invention for combating lost drilling fluid circulation into a subterranean thief zone penetrated by a well bore basically comprise the steps of forming a quick set cementitious composition comprised of an amorphous silica material, water present in an amount sufficient to form a slurry and an alkali present in an amount sufficient to react with the amorphous silica material in the presence of water to form a cementitious composition which subsequently sets into a hard substantially impermeable mass, introducing the cementitious composition into the thief zone by way of the well bore, allowing the cementitious composition to set into a plug in the thief zone and in the well bore, and then continuing the drilling of the well bore through and below the plug.

In order to further illustrate the methods and cementitious compositions of this invention, the following examples are given.

EXAMPLE 1

A quick set amorphous silica cementitious composition of the present invention was prepared by mixing 42.5 pounds of ASTM Class C fly ash having a specific gravity of 2.7 and 7.5 pounds of condensed silica fume having a specific gravity of 2.5 with various quantities of fresh water to form cementitious compositions having densities of 11.5, 12.5 and 13.5 pounds per gallon. Various quantities of citric acid set retarder were added to test samples of the base compositions and the samples were tested for rheologies, thickening times and compressive strengths. The tests were conducted in accordance with the API Specification For Materials And Testing For Well Cements, API Specification 10A, 21st Edition dated Sep. 1, 1991, of the American Petroleum Institute, Washington, D.C. The results of the tests are set forth in Table III below.

TABLE III

Rheologies, Thickening Times And Compressive Strengths Of Amorphous Silica Cementitious Compositions[1]

| Composition Density, lb/gal. | Test Temperature, °F. | Quantity Of Set Retarder[2] In Composition, % By Weight Of Amorphous Silica | Composition Rheology,[3] centipoises | | | | | | Thickening Time,[4] hr:min. | Compressive Strength,[5] psi | |
|---|---|---|---|---|---|---|---|---|---|---|---|
| | | | 600 rpm | 300 rpm | 200 rpm | 100 rpm | 6 rpm | 3 rpm | | 8 hr. | 24 hr. |
| 11.5 | 80 | — | 17 | 11 | 9 | 7 | 4 | 3 | 3:00+ | — | 20 |
| 12.5 | 80 | 0.1 | 24 | 15 | 12 | 10 | 5 | 5 | 1:12 | 52 | 97 |
| 13.5 | 80 | 0.1 | 50 | 35 | 30 | 25 | 18 | 14 | 1:05 | 194 | 393 |
| 11.5 | 100 | — | — | — | — | — | — | — | 3:00+ | 35 | 25 |
| 12.5 | 100 | 0.2 | 20 | 13 | 10 | 7 | 3 | 2 | 1:18 | 108 | 198 |
| 13.5 | 100 | 0.2 | 28 | 17 | 12 | 9 | 5 | 4 | 1:15 | 273 | 405 |
| 11.5 | 120 | — | — | — | — | — | — | — | 3:00+ | 44 | 43 |
| 12.5 | 120 | 0.25 | 16 | 10 | 8 | 6 | 3 | 3 | 1:25 | 138 | 190 |
| 13.5 | 120 | 0.3 | 26 | 16 | 10 | 8 | 4 | 3 | 1:42 | 290 | 317 |
| 11.5 | 140 | — | — | — | — | — | — | — | 3:00+ | 70 | 73 |
| 12.5 | 140 | 0.3 | 17 | 10 | 9 | 7 | 4 | 3 | 1:26 | 401 | 388 |
| 13.5 | 140 | 0.3 | — | — | — | — | — | — | 1:05 | 197 | 247 |
| 11.5 | 160 | — | — | — | — | — | — | — | 3:00+ | 55 | 61 |
| 12.5 | 160 | 0.4 | 17 | 9 | 8 | 5 | 2 | 2 | 1:35 | 376 | 400 |
| 13.5 | 160 | 0.45 | — | — | — | — | — | — | 1:20 | 287 | 361 |
| 11.5 | 180 | — | — | — | — | — | — | — | 3:00+ | 43 | 64 |
| 12.5 | 180 | 0.4 | — | — | — | — | — | — | 1:27 | — | 225 |
| 13.5 | 180 | 0.5 | 32 | 24 | 21 | 17 | 13 | 13 | 1:42 | 380 | 507 |
| 11.5 | 200 | — | — | — | — | — | — | — | 3:00+ | 60 | 77 |
| 12.5 | 200 | 0.45 | 18 | 10 | 9 | 5 | 2 | 2 | 1:32 | 130 | 147 |
| 13.5 | 200 | 0.5 | — | — | — | — | — | — | 1:35 | 337 | 387 |

[1] Base composition comprised of 42.5 lb ASTM Class C fly ash, 7.5 lb. condensed silica fume and fresh water.
[2] Set retarder was citric acid.
[3] Rheology measured on a Fann Model 35 viscometer.
[4] Thickening times were measured on a Halliburton Atmospheric Consistometer at a heating rate of 2° F./min. until the desired circulation temperature was reached.
[5] Compressive strengths were measured on an ultrasonic cement analyzer.

From Table III it can be seen that a number of the compositions provided good compressive strengths in eight hours over a broad temperature range.

EXAMPLE 2

Based on the results set forth in Table III, a cementitious composition comprised of 42.5 pounds of ASTM Class C fly ash and 7.5 pounds of condensed silica fume mixed with 4.75 gallons of water to produce a cementitious composition having a density of 12.5 pounds per gallon was prepared. Various quantities of citric acid retarder were added to test samples of the base composition which were tested for rheologies, thickening times and compressive strengths at various temperatures. The results of these tests are set forth in Table IV below.

TABLE IV

Rheologies, Thickening Times And Compressive Strengths Of Amorphous Silica Cementitious Compositions[1]

| Test Temperature, °F. | Quantity Of Set Retarder[2] In Composition, % By Weight Of Amorphous Silica | Composition Rheology,[3] centipoises | | | | | | Thickening Time,[4] hr:min. | Compressive Strength,[5] psi | |
|---|---|---|---|---|---|---|---|---|---|---|
| | | 600 rpm | 300 rpm | 200 rpm | 100 rpm | 6 rpm | 3 rpm | | 8 hr. | 24 hr. |
| 80 | — | 105 | 93 | 86 | 78 | 46 | 38 | 0:22 | — | — |
| 80 | 0.1 | — | — | — | — | — | — | 0:40 | — | — |
| 80 | 0.15 | 53 | 41 | 36 | 30 | 24 | 19 | 1:03 | 230 | 530 |
| 100 | 0.1 | — | — | — | — | — | — | 0:20 | — | — |
| 100 | 0.2 | — | — | — | — | — | — | 0:45 | — | — |
| 100 | 0.3 | — | — | — | — | — | — | 1:40 | 182 | 263 |
| 120 | 0.3 | — | — | — | — | — | — | 1:10 | 292 | 320 |
| 140 | 0.35 | 55 | 46 | 43 | 38 | 29 | 25 | 1:21 | 162 | 182 |

TABLE IV-continued

Rheologies, Thickening Times And Compressive Strengths Of Amorphous Silica Cementitious Compositions[1]

| Test Temperature, °F. | Quantity Of Set Retarder[2] In Composition, % By Weight Of Amorphous Silica | Composition Rheology,[3] centipoises | | | | | | Thickening Time,[4] hr:min. | Compressive Strength,[5] psi | |
|---|---|---|---|---|---|---|---|---|---|---|
| | | 600 rpm | 300 rpm | 200 rpm | 100 rpm | 6 rpm | 3 rpm | | 8 hr. | 24 hr. |
| 140 | 0.4 | — | — | — | — | — | — | 2:15 | — | — |
| 160 | 0.5 | 59 | 49 | 45 | 40 | 34 | 30 | 1:30 | 180 | 232 |

[1]Base composition comprised of 42.5 lb ASTM Class C fly ash, 7.5 lb. condensed silica fume and fresh water.
[2]Set retarder was citric acid.
[3]Rheology measured on a Fann Model 35 viscometer.
[4]Thickening times were measured on a Halliburton Atmospheric Consistometer at a heating rate of 2° F./min. until the desired circulation temperature was reached.
[5]Compressive strengths were measured on an ultrasonic cement analyzer.

To be successful in forming a plug to prevent lost drilling fluid circulation in a geothermal well, a cementitious composition must be capable of being formed by the addition of water only to a dry preblended amorphous silica mixture. Once formed, the cementitious composition ideally should have a thickening time no longer than about 2 hours and develop a compressive strength of about 200 psi in eight hours over a temperature range of from about 80° F. to about 200° F.

From Table IV it can be seen that the amorphous silica cementitious compositions tested meet the above described criteria for forming plugs in geothermal wells.

EXAMPLE 3

Various commonly used drilling fluids were contaminated with drill cuttings from the base cementitious composition described in Example 2 after the composition cured for 4 hours at 80° F. 28 grams of drill cuttings were combined with 400 grams of the drilling fluid samples tested to produce a 5% by volume contamination of the drilling fluids with the drill cuttings. After stirring the contaminated drilling fluids for 5 minutes, their rheologies were determined and compared to uncontaminated drilling fluid rheologies. The results of these tests are set forth in Table V below.

TABLE V

Rheologies Of Drilling Fluids With And Without Drill Cuttings Contamination

| Drilling Fluid Tested | Drilling Fluid Contamination % Drill Cuttings[1] By Volume Of Drilling Fluid | Contaminated Drilling Fluid Rheology,[2] centipoises | | | | | |
|---|---|---|---|---|---|---|---|
| | | 600 rpm | 300 rpm | 200 rpm | 100 rpm | 6 rpm | 3 rpm |
| Spud Mud[3] | 0 | 30 | 19 | 15 | 10 | 5 | 5 |
| Spud Mud | 5 | Too Thick To Measure | | | | | |
| Dispersed Mud[4] | 0 | 33 | 19 | 14 | 8 | 1 | 1 |
| Dispersed Mud | 5 | 40 | 25 | 18 | 11 | 2 | 2 |
| Poly Plus Mud[5] | 0 | — | — | — | — | — | — |
| Poly Plus Mud | 5 | 95 | 65 | 53 | 38 | 10 | 9 |
| Gel Chem Mud[6] | 0 | 101 | 65 | 49 | 31 | 8 | 5 |
| Gel Chem Mud | 5 | 105 | 67 | 55 | 39 | 11 | 11 |
| Gyp Mud[7] | 0 | 100 | 67 | 54 | 37 | 14 | 14 |
| Gyp Mud | 5 | 135 | 94 | 80 | 61 | 38 | 38 |
| Poly Plus Soltex Mud[5] | 0 | 73 | 52 | 42 | 32 | 20 | 19 |
| Poly Plus Soltex Mud | 5 | 62 | 40 | 35 | 24 | 9 | 9 |

[1]Drill cuttings were from set amorphous silica cementitious composition comprised of 42.5 lb ASTM Class C fly ash, 7.5 lb. condensed silica fume and fresh water to provide density of 12.5 lb/gal.
[2]Rheology measured on a Fann Model 35 Viscometer.
[3]A native formation water base mud system which generally is non-dispersed, has a low density and is a thick bentonite-like slurry.
[4]A lignosulfonate dispersed water base mud containing barite, bentonite, caustic soda, lime, lignite and other components.
[5]A water based mud containing barite, bentonite, caustic soda, various high molecular weight polymers including partially hydrolyzed polyacrylamide and other components.
[6]A water base mud containing barite chemically treated bentonite and other components.
[7]A water base mud containing barite, bentonite, caustic soda, gypsum and other components.

As shown in Table V, the drill cuttings did not materially affect the rheologies of most of the drilling fluids tested.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. An improved method of combating lost drilling fluid circulation into a subterranean thief zone penetrated by a well bore comprising the steps of:

forming a quick set cementitious composition comprised of an amorphous silica material, water present in an amount sufficient to form a slurry and an alkali present in an amount sufficient to react with said amorphous silica material in the presence of said water to form a cementitious composition which subsequently sets into a hard substantially impermeable mass;

introducing said cementitious composition into said thief zone by way of said well bore;

allowing said cementitious composition to set into a cementitious plug in said thief zone and in said well bore; and then continuing the drilling of said well bore through and below said cementitious plug.

2. The method of claim 1 wherein said amorphous silica material is selected from the group consisting of fly ash, condensed silica fume, rice hull ash, natural pozzolan and mixtures of two or more of said materials.

3. The method of claim 1 wherein said amorphous silica material is of a fine particle size.

4. The method of claim 3 wherein said amorphous silica material and said alkali are present in said composition in the form of ASTM Class C fly ash.

5. The method of claim 4 wherein said cementitious composition further comprises condensed silica fume in an amount in the range of from about 10% to about 20% by weight of said ASTM Class C fly ash in said composition.

6. The method of claim 3 wherein said cementitious composition further comprises a dispersing agent for facilitating the dispersal of said amorphous silica material particles in said water and maintaining said particles in suspension therein.

7. The method of claim 6 wherein said dispersing agent is comprised of the condensation polymer product of acetone, formaldehyde and sodium sulfite and is present in said composition in an amount in the range of from about 0.25% to about 1.25% by weight of said amorphous silica material therein.

8. The method of claim 2 wherein said alkali is selected from the group consisting of calcium hydroxide, barium hydroxide, magnesium oxide, strontium oxide and mixtures of two or more of said compounds.

9. The method of claim 2 wherein said alkali is calcium hydroxide and is present in said composition in an amount in the range of from about 10% to about 20% by weight of amorphous silica material therein.

10. The method of claim 2 which further comprises a set retarder selected from the group consisting of ammonium and metal lignosulfonate salts, tartaric acid, citric acid, trisodium citrate gluconic acid, potassium pentaborate, potassium perborate, the copolymer of 2-acrylamido-2-methylpropane sulfonic acid and acrylic acid, aminotri(methylenephosphonic acid) and mixtures of two or more of such set retarders.

11. The method of claim 10 wherein said set retarder is citric acid and is present in said composition in an amount in the range of from about 0.1% to about 1.25% by weight of amorphous silica material therein.

12. An improved method of combating lost drilling fluid circulation into a subterranean thief zone penetrated by a well bore, comprising the steps of:

forming a quick set cementitious composition comprised of an amorphous silica material selected from the group consisting of fly ash, condensed silica fume, rice hull ash, natural pozzolan mixtures of two or more of said materials, water present in an amount sufficient to form a pumpable slurry and an alkali present in an amount sufficient to react with said amorphous silica material in the presence of said water to form a cementitious composition which sets into a hard substantially impermeable mass;

pumping said cementitious composition into said thief zone by way of said well bore;

allowing said cementitious composition to set into a cementitious plug in said thief zone and in said well bore; and then continuing the drilling of said well bore through and below said cementitious plug.

13. The method of claim 12 wherein said amorphous silica material and said alkali are present in said composition in the form of ASTM Class C fly ash.

14. The method of claim 13 wherein said cementitious composition further comprises condensed silica fume in an amount in the range of from about 10% to about 20% by weight of said ASTM Class C fly ash in said composition.

15. The method of claim 12 wherein said amorphous silica material is of a fine particle size, and said cementitious composition further comprises a dispersing agent for facilitating the dispersal of said amorphous silica material particles in said water and maintaining said particles in suspension therein.

16. The method of claim 15 wherein said dispersing agent is comprised of the condensation polymer product of acetone, formaldehyde and sodium sulfite and is present in said composition in an amount in the range of from about 0.25% to about 1.25% by weight of said amorphous silica material therein.

17. The method of claim 12 which further comprises a citric acid set retarder present in said composition in an amount in the range of from about 0.1% to about 1.25% by weight of amorphous silica material therein.

18. An improved method of combating lost drilling fluid circulation into a subterranean thief zone penetrated by a well bore comprising the steps of:

forming a quick set cementitious composition comprised of ASTM Class C fly ash, condensed silica fume and water present in an amount sufficient to form a pumpable slurry;

pumping said cementitious composition into said thief zone by way of said well bore;

allowing said cementitious composition to set into a hard substantially impermeable plug in said thief zone and in said well bore; and then continuing the drilling of said well bore through and below said cementitious plug.

19. The method of claim 18 wherein said cementitious composition further comprises a dispersing agent comprised of the condensation polymer product of acetone, formaldehyde and sodium sulfite present in said composition in an amount in the range of from about 0.25% to about 1.25% by weight of said ASTM Class C fly ash and condensed silica fume therein.

20. The method of claim 19 wherein said cementitious composition further comprises a citric acid set retarder present in said composition in an amount in the range of from about 0.1% to about 1.25% by weight of ASTM Class C fly ash and condensed silica fume therein.

* * * * *